(12) United States Patent
Wehner et al.

(10) Patent No.: US 9,189,192 B2
(45) Date of Patent: Nov. 17, 2015

(54) DRIVERLESS PRINTING SYSTEM, APPARATUS AND METHOD

(75) Inventors: Ulrich Wehner, Lawrenceville, GA (US); Kazutaka Oba, Duluth, GA (US)

(73) Assignee: RICOH COMPANY, LTD., Tokyo (JP)

( * ) Notice: Subject to any disclaimer, the term of this patent is extended or adjusted under 35 U.S.C. 154(b) by 1582 days.

(21) Appl. No.: 11/726,164

(22) Filed: Mar. 20, 2007

(65) Prior Publication Data

US 2008/0231886 A1 Sep. 25, 2008

(51) Int. Cl.
*G06F 3/12* (2006.01)

(52) U.S. Cl.
CPC ............ *G06F 3/1288* (2013.01); *G06F 3/1204* (2013.01); *G06F 3/1228* (2013.01); *G06F 3/1247* (2013.01)

(58) Field of Classification Search
USPC ......... 358/1.13–1.18, 1.6, 1.9, 402, 403, 407, 358/444, 462, 296, 305; 709/201, 202, 203, 709/212, 217, 220, 223, 230, 238, 244; 707/609, 613, 626, 636, 661, 665, 667, 707/668, 671, 672, 705, 711, 715, 736, 738, 707/739, 741, 742, 764, 781, 804; 714/1, 2, 714/5.1, 25, 37, 39, 40, 44, 47.1, 48, 49, 50, 714/51, 52, 57, 100; 700/12, 17, 18, 21, 28, 700/32, 78, 79, 83, 51, 275
See application file for complete search history.

(56) References Cited

U.S. PATENT DOCUMENTS

| | | | |
|---|---|---|---|
| 6,407,820 B1 | 6/2002 | Hansen et al. | |
| 6,757,070 B1 * | 6/2004 | Lin et al. | .......... 358/1.1 |
| 6,842,593 B2 | 1/2005 | Cannon | |
| 6,943,905 B2 * | 9/2005 | Ferlitsch | ........ 358/1.13 |
| 6,952,831 B1 * | 10/2005 | Moore | ........... 719/327 |
| 6,993,562 B2 * | 1/2006 | Treptow et al. | ........ 709/206 |
| 7,064,856 B2 * | 6/2006 | Fu et al. | ........ 358/1.18 |
| 7,072,055 B1 * | 7/2006 | Carter et al. | ........ 358/1.15 |
| 7,102,768 B2 * | 9/2006 | Daly et al. | ........ 358/1.13 |
| 7,190,467 B2 * | 3/2007 | Simpson et al. | ........ 358/1.1 |
| 7,321,437 B2 * | 1/2008 | Parry | ........ 358/1.15 |
| 7,365,870 B2 * | 4/2008 | Ferlitsch | ........ 358/1.15 |
| 7,411,692 B2 * | 8/2008 | Ferlitsch | ........ 358/1.15 |
| 7,843,594 B2 * | 11/2010 | Ferlitsch | ........ 358/1.16 |
| 7,920,280 B2 * | 4/2011 | Furuya | ........ 358/1.13 |

(Continued)

FOREIGN PATENT DOCUMENTS

| | | |
|---|---|---|
| EP | 1276042 A2 | 1/2003 |
| JP | 2005-71187 | 3/2005 |

(Continued)

OTHER PUBLICATIONS

Jun. 16, 2009 European official action in connection with a counterpart European patent application No. 07 121 258.3.

(Continued)

*Primary Examiner* — Jonathan R Beckley

(74) *Attorney, Agent, or Firm* — Cooper & Dunham LLP

(57) ABSTRACT

Systems, apparatuses and methods for submitting a print job to a specified printer are provided which include means for and/or steps of (i) converting a document created with a specific application and to be printed, into a print-ready form that is independent of the specific printer and independent of computing platform, and (ii) submitting the print job to the specified printer, without using a printer driver.

16 Claims, 5 Drawing Sheets

(56) References Cited

U.S. PATENT DOCUMENTS

| | | | |
|---|---|---|---|
| 7,941,541 B2* | 5/2011 | Chang et al. | 709/227 |
| 2002/0051200 A1* | 5/2002 | Chang et al. | 358/1.15 |
| 2002/0077980 A1* | 6/2002 | Chang et al. | 705/40 |
| 2002/0083121 A1* | 6/2002 | Chang et al. | 709/201 |
| 2002/0138564 A1* | 9/2002 | Treptow et al. | 709/203 |
| 2002/0156796 A1 | 10/2002 | Hisamatsu et al. | |
| 2002/0171857 A1* | 11/2002 | Hisatomi et al. | 358/1.13 |
| 2002/0186393 A1* | 12/2002 | Pochuev et al. | 358/1.13 |
| 2002/0191210 A1 | 12/2002 | Staas et al. | |
| 2003/0035133 A1 | 2/2003 | Berkema et al. | |
| 2003/0197887 A1* | 10/2003 | Shenoy et al. | 358/1.15 |
| 2003/0227644 A1* | 12/2003 | Ferlitsch | 358/1.13 |
| 2004/0001217 A1* | 1/2004 | Wu | 358/1.15 |
| 2004/0130744 A1* | 7/2004 | Wu et al. | 358/1.15 |
| 2005/0046886 A1* | 3/2005 | Ferlitsch | 358/1.13 |
| 2005/0068560 A1* | 3/2005 | Ferlitsch | 358/1.13 |
| 2005/0190405 A1* | 9/2005 | Tomita | 358/1.18 |
| 2005/0223390 A1 | 10/2005 | Moore | |
| 2005/0262049 A1 | 11/2005 | Somppi | |
| 2005/0283735 A1* | 12/2005 | Ferlitsch et al. | 715/771 |
| 2005/0286063 A1* | 12/2005 | Owen et al. | 358/1.13 |
| 2006/0077421 A1* | 4/2006 | Eden et al. | 358/1.15 |
| 2006/0253894 A1* | 11/2006 | Bookman et al. | 726/2 |
| 2006/0279780 A1 | 12/2006 | Anno et al. | |
| 2007/0146760 A1* | 6/2007 | Takatsu | 358/1.13 |
| 2008/0158581 A1* | 7/2008 | Ferlitsch | 358/1.13 |
| 2009/0231609 A1* | 9/2009 | Chipchase et al. | 358/1.15 |

FOREIGN PATENT DOCUMENTS

| | | |
|---|---|---|
| JP | 2005-251179 | 9/2005 |
| JP | 2006-344172 | 12/2006 |
| WO | WO2006/074258 A2 | 7/2006 |
| WO | WO 2007000621 A1 * | 1/2007 |

OTHER PUBLICATIONS

FSG/Open Printing Job Ticket Application Programming Interface (JTAPI) Version 1.00 Mar. 15, 2005.

May 8, 2008 European search report in connection with corresponding European patent application No. EP 07 12 1258.

Feb. 7, 2012 Japanese official action in connection with a counterpart Japanese patent application.

* cited by examiner

DRIVERLESS PRINTING SYSTEM, APPARATUS AND METHOD

TECHNICAL FIELD

This application relates to submitting print jobs. In particular, the application relates to a system, apparatus and method for submitting an electronic document or file for printing, without using a printer driver.

BACKGROUND

In the current information age, there are often discussions of the desirableness of a paperless society. However, notwithstanding such discussions, there remains a great need by users of computers and other information terminals (that is, any of the various conventional devices which have a need to print on demand, such as personal computers, notebook computers, workstations, other types of computers, kiosks, PDAs, other information appliances, etc.) for printing functionality. Therefore, devices having printing or plotting functionality, such as printers, copiers, multi-function devices, etc., continue to play a significant role in information technology (IT) at home and at work. The terms "printer" and "printer device" are used hereinafter generically to include any output device having a printing or plotting functionality, and include multi-function devices having a copy and/or scanning functionality in addition to the printing or plotting functionality.

A computing device typically submits an electronic document or file to a specified printer by use of a pre-installed print driver, using facilities provided by the operating system, and the application that was used to create the file.

Typically, a print driver plugs into the infrastructure within the underlying print system provided by the operating system of a computing device. Drivers are generally provided by device manufacturers, and the drivers support specific devices, specific features and certain operating systems.

For example, a computing device having only a print driver for printing to a printer of printer type number one, in most instances, will not be able to print with a printer of printer type number two. Similarly, a computing device running an operating system (OS) of OS type number one, cannot use a print driver supporting OS type number two (but not supporting OS type number one). As another example, a computing device having only a print driver supporting single-sided printing (but not supporting duplex printing) to a specific printer will not be able to perform duplex printing to the specified printer, even if the specific printer has duplex printing capabilities.

The limitations of print drivers make it difficult for users of any computing device to submit any file to any printer. It is unlikely that any one computing device has print drivers for each printing device. This is a real constraint in the current information age in which information terminals have mobility and network capabilities that allow the terminals to receive and/or download files from heterogeneous sources, and allow the terminal to navigate to previously unvisited IT environments having printing devices for which the terminal does not have print drivers.

It is also unlikely that any such computing device has all of the applications needed for all files that might require printing. Further, even if a computing device has an application of one version does not necessarily ensure that the computing device can print (or at least obtain an acceptable printout of) a file created by a different version of the application.

Mobile or hand held devices often do not have an operating system that supports printer drivers, printer ports, or many of the applications in typical use today. While unable to create many file types, they can often receive or download these files by means like electronic mail, web browsers, etc.

In addition, installation of print drivers requires knowledge of the target printing device, access to the drivers, privileges to install drivers on the information terminal, and often overwhelms the user, resulting in frustrations, help desk calls, and unpredictable results.

There is a need for better techniques for submitting files to printing devices.

BRIEF SUMMARY

This disclosure describes methods, apparatuses and systems for computing devices to submit files to printers regardless of operating system, application availability, or driver support.

In one aspect of this disclosure, a system can be provided with capabilities to discover unknown printing devices and provide the results of the discovery to the user.

In another aspect of this disclosure, a system can be provided with capabilities to discover the capabilities of the printing devices and describe them to the user.

Further, the subject matter of this disclosure also can include providing capabilities to the user to specify options to be applied to a print job.

In one exemplary embodiment of the disclosure, an apparatus and/or method (for example implemented on one or more information terminals configured through an appropriate program of instructions, to print to a selected printer in a printing system) for submitting a print job to a specified printer is configured to (i) convert a document created with a specific application and to be printed, into a print-ready form that is independent of the specific printer and independent of computing platform, and (ii) submit the print job to the specified printer, without using a printer driver.

For example, such features, in whole or in part, may be implemented as a print application provided through a network to an information terminal enabling a user to print a print job on a specified printer, without using a printer driver.

BRIEF DESCRIPTION OF THE DRAWINGS

The features of the subject matter of this disclosure can be more readily understood from the following detailed description with reference to the accompanying drawings wherein.

DETAILED DESCRIPTION OF EXEMPLARY EMBODIMENTS

Figure 1:
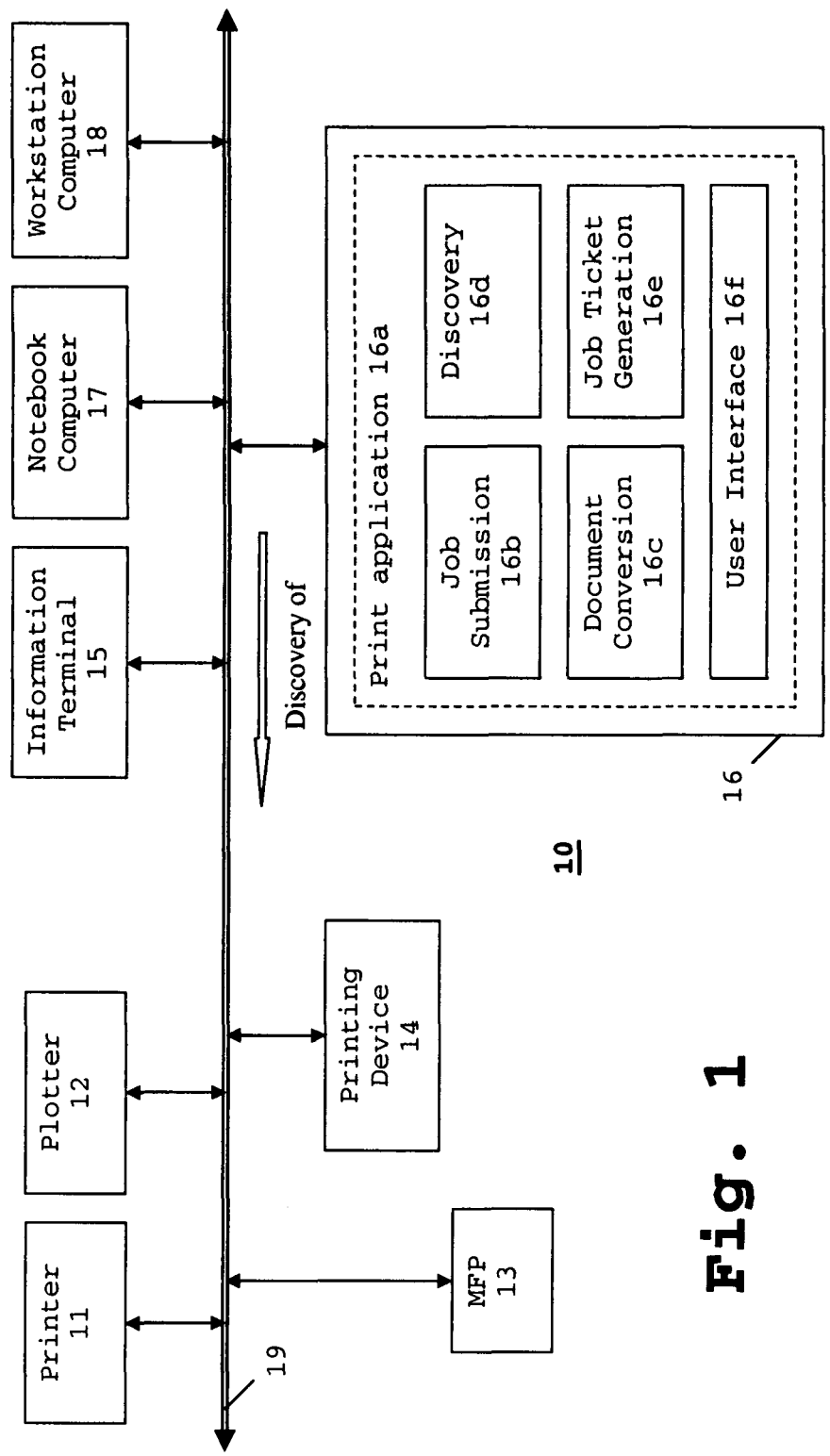
FIG. 1 shows a block diagram illustrating a printing system in accordance with a first exemplary embodiment of the subject matter of this disclosure.

In describing exemplary embodiments illustrated in the drawings, specific terminology is employed for the sake of clarity. However, the subject matter of this patent specification is not intended to be limited to the specific terminology so selected and it is to be understood that each specific element includes all technical equivalents that operate in a similar manner.

This patent specification describes tools (in the form of methods, apparatuses and systems) for printing from any platform to any printer, without using a print driver. The tools convert the document created with a specific application and to be printed, to a print-ready format (that is, ready to be printed) independent of the specific printer and independent of computing platform. Such print-ready files can be printed on any of various different printers, and can be submitted without using the specific application that created the original document.

In a preferred embodiment, the user is provided with means to create a job ticket (or retrieve a previously stored job ticket) that specifies selected output options. The print-ready file and the job ticket collectively define the print job, and are submitted to the specified printer, without using a printer driver. The print-ready file and the job ticket are independent of the specific printer and independent of computing platform, and can be individually stored (and perhaps archived) and can be utilized for another print job sent from any information terminal, regardless of the computing platform of the information terminal and regardless of the target printing device. Further, said any information terminal need not have the specific application software with which the original document was created, in order to submit a print job constituted by the print-ready file and a job ticket. In addition, a job ticket can be used with each of multiple print-ready files to obtain printed documents each having the same output format.

The drawings show examples of implementations of the subject matter of this patent disclosure in several computing environments. However, it should be understood that the subject matter of this disclosure can be utilized by any computing device including but not limited to PDAs, cell phones, personal, notebook and workstation computers, kiosks, other information terminals, etc. In addition, the subject matter of this disclosure might be provided as services in a modular fashion by other devices connected by a communication network.

A first exemplary embodiment in which the subject matter of this disclosure is embodied in a print application installed on a computing device will be described below with reference to FIG. 1.

FIG. 1 shows a printing system 10 comprised of a plurality of printing devices, including printer 11, plotter 12, MFP (multi-function peripheral) device 13 and printing device 14, and a plurality of information terminals or computing devices, including information terminal 15, personal computer 16, notebook computer 17 and workstation 18, all interconnected through a network 19. The network 19 can be any type of wired or wireless network, such as a local area network, a wide area network, an intranet, an extranet, the Internet, etc., or a combination thereof.

The personal computer 16 is shown in FIG. 1 to include a print application 16a including a job submission part 16b, a document conversion part 16c, a discovery part 16d, a job ticket generation part 16e and a user interface 16f. However, any information terminal connected to the network 19 can be configured with a print application (similar to 16a).

The document conversion part 16c is configured to convert an electronic document created with a specific application software and to be printed, into a print-ready form that is independent of the specific printing device and independent of computing platform. Job files can be submitted to the printing device in native format, if such format is supported by the printer, or converted by the document conversion part 16c, as required. Examples of print-ready form include PCL, PJL, PS, PRN, XPS, PDF, TIFF, JPEG, TXT, ASCII, etc. Such print-ready form allows the user to view the file on any platform that has capability to handle this format (and will appear the same in each instance). Further, a print-ready file can be archived and one can expect that the archived file (unlike application files) can be printed years or decades later.

The print application 16a and the document conversion part 16c can operate without the personal computer 16 having the specific application thereon. Even if the personal computer 16 has the specific application, the print job is submitted by the job submission part 16b to a specified printer, without using a printer driver and preferably without opening the specific application.

In addition, the personal computer 16 as configured with the print application 16a preferably can discover the printers on the network through the discovery part 16d, and a description of printers is provided by the user interface 16f. The printer description can include basic capabilities, location information, etc. The user can select a desired printer using the description of printers provided by the user interface 16f. The discovery part 16d can also discover the capabilities (for example, duplex/simplex, staple, number of copies, paper source, paper size and type, portrait, color, two-up, hole punch, scaling, etc.) of each printer by communication with the printer, and the results of the discovery are presented through the user interface 16f to the user. Printers can be discovered using any of various known discovery methods including, but not limited to, SNMP (such as versions v1, v2, v3) broadcast, ping sweep, DNS, Ports, NetBIOS, WMI, Bonjour, Zeroconf, etc Printer capabilities can be discovered using known protocols including, but not limited to, SNMP, IPP, PJL, etc. . In addition, discovery may also include consulting a MIB (Management Information Base) database and/or an asset management system. The discovery may be a general discovery broadcast or may be guided by a specified search range, hostname, network address, previous search settings, etc.

For example, the user interface 16f can present for each printer, a list of the detailed capabilities of the printer, to a user for selection. The detailed capabilities of a selected printer are described through the user interface to the user, and enables the user to select job ticket options to be applied to the job. The job ticket formation part 16e generates a job ticket based on the selected options, and the job ticket can be associated with the print job. The job ticket formation part 16e can generate job tickets complying with the JTAPI (Job Ticket Application Programming Interface) standard, and/or as PJL (printer job language) as supported by the printer.

The job ticket specifies the output options, and can include additional information such as user name, password or other authentication information, timestamp, communication protocol, other communication-related information (such as encryption), finishing options, special instructions (such as "do not print until entire job received", "do not print until user enters code at printing device", what to do with output, etc.).

The user interface allows the user to select the job together with the job ticket, and then the job submission part 16b submits the selected job file and job ticket to the specified printer using one of the supported transport methods. These include, but are not limited to, TCP/IP socket, LPR, FTP, secure FTP, HTTP, HTTP secure, IPP, IPP secure, SSH file transfer, WebDAV, etc. The print application can maintain a list of previously used printers, previously used job tickets, previously used communication methods, to allow for a faster and more automated workflow in the future.

A method for assembling a print job and submitted it to a specified printer will now be described with reference to FIGS. 1 and 2. A device discovery request is output to the network 19 by the print application 16a on the personal computer 16 (step S21), and the print application assembles information identifying the responding printing devices. Next, the print application sends a query to each responding device to inquire the capabilities of the device (step S23), and stores information from the response of the device. In addition, the print application queries the device regarding the transport protocols supported by the device (step S25), and stores communication transport information received from the device. The print application provides descriptions of the available printers to the user through the user interface 16f to enable the user to select a printer and select desired print output options for the print job, and then generates a job ticket based on the selected print output options (step S27). The assembled print job including the job ticket is transmitted to the selected printer (step S29). The process may also include converting the electronic document to be printed into a print ready file that can be handled by any printer, although at least in some instances the electronic document will already be in a print ready form, even without conversion.

Figure 3:
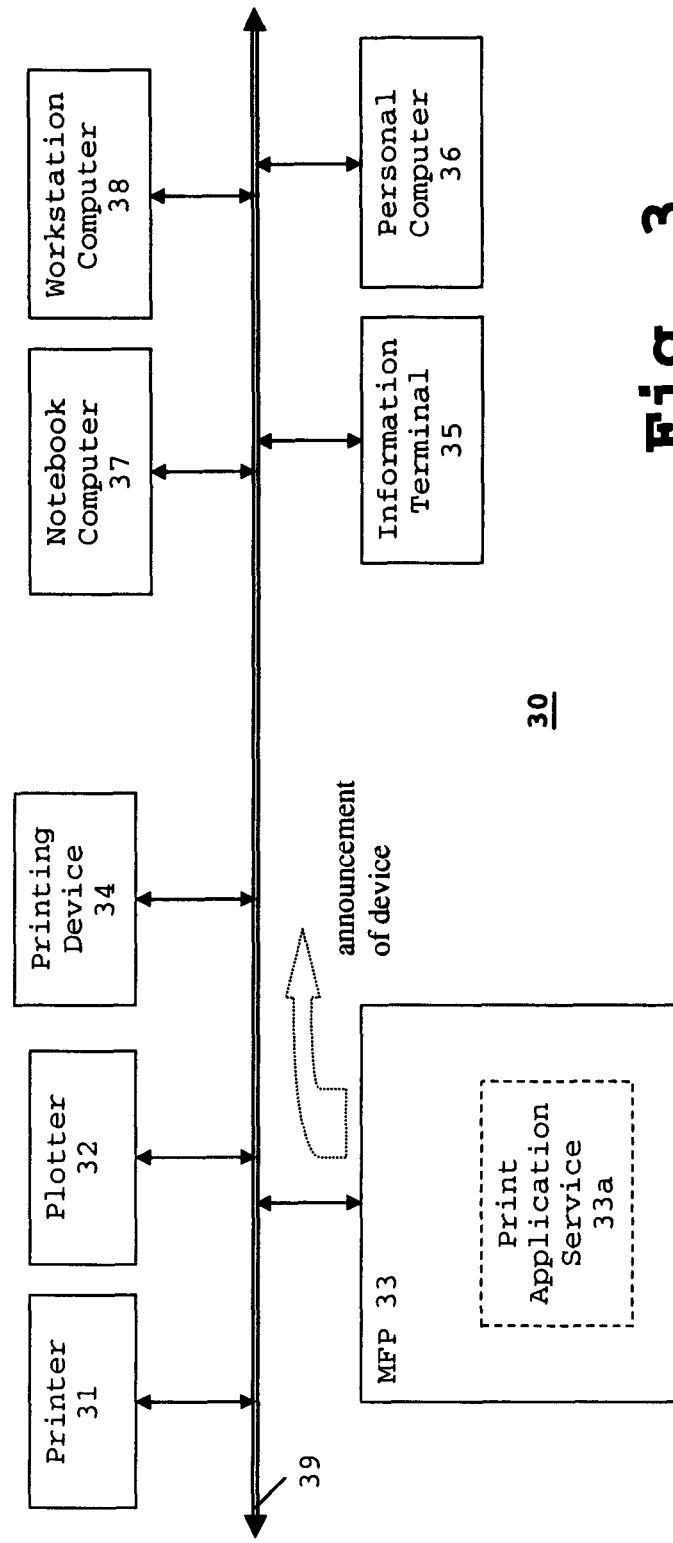
FIG. 3 shows a block diagram illustrating a system in accordance with a second exemplary embodiment.

FIG. 3 shows a system 30, in accordance with a second exemplary embodiment, comprised of a plurality of printing devices (including printer 31, plotter 32, MFP 33 and printing device 34) and a plurality of information terminals (including information terminal 35, personal computer 36, notebook computer 37 and workstation 38), interconnected through network 39. In the embodiment shown in FIG. 3, the print application is supplied as a service by service component 33a residing on the MFP 33, to any computing device capable of communicating with the MFP 33 and the service component 33a.

The service component 33a can announce itself on the network 39 and describe the MFP and its capabilities to the user. The print application provided by the service component 33a of the MFP 33 as a service to the information terminals can be similar to the print application 16a residing natively on the personal computer 16 in FIG. 1, including any combination of parts of the print application 16a.

The print application provided by the service component 33a enables the user to create a job ticket, convert the electronic document into print ready form (if not already a print ready file), and submit the job file with job ticket utilizing the appropriate submission method. Submission methods include but are not limited to HTTP, HTTP secure, FTP, FTP secure, etc. In order to improve future workflow for the user (as well as collect usage information), the system can collect and store information associated with jobs assembled by the user, including the job ticket.

While FIG. 3 shows the print application service being available from the MFP 33, each or any printing device connected to the network 39 can be configured to host a service component similar to service component 33a, to provide print application service to the information terminals 35-38.

A third exemplary embodiment in which the print application is provided to a computing device by a server hosting the print application service is described below.

Figure 4:
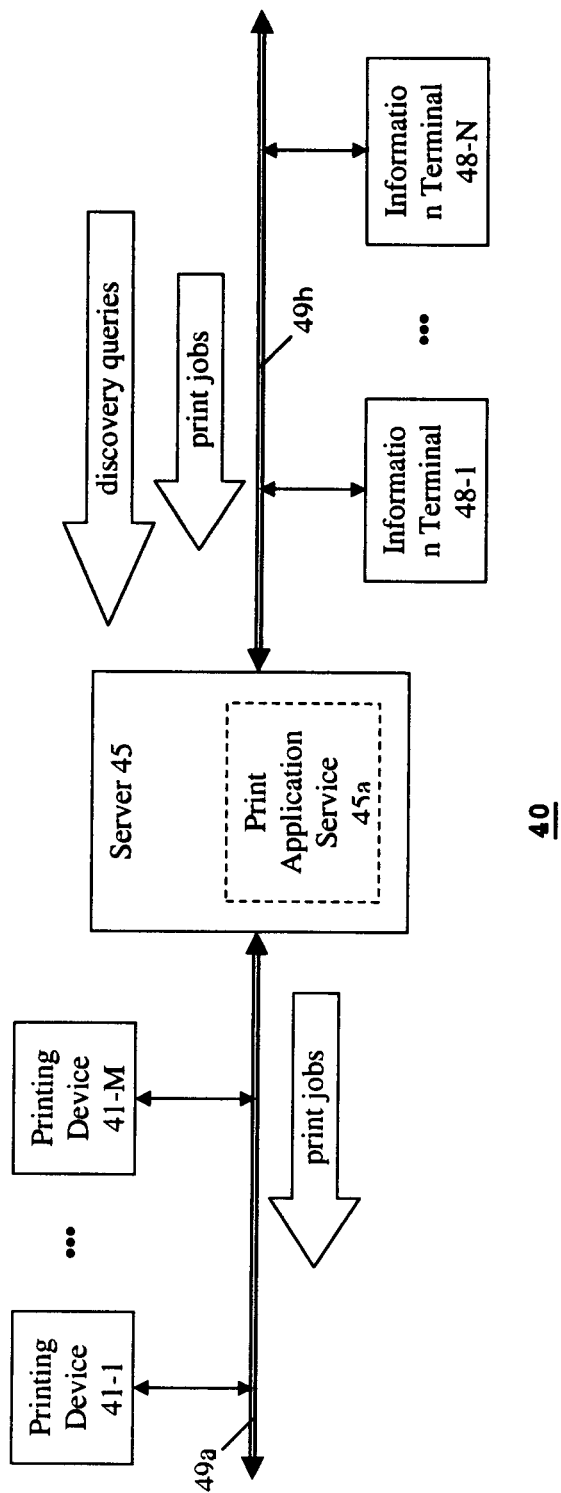
FIG. 4 shows a block diagram illustrating a system in accordance with a third exemplary embodiment.

FIG. 4 shows a system 40 comprised of a plurality of printing devices (41-1 through 41-M) and a plurality of information terminals (48-1 through 48-N). The printing devices 41-1 through 41-M are connected to server 45 through network 49a, and the information terminals 48-1 through 48-N through the network 49b. The network 49a and the network 49b may be the same network, interconnected networks, or unconnected networks. The server 45 hosts a service of providing a print application to the information terminals 48-1 through 48-N, and announces the print application service on the network 49b.

The server 45 can discover the available printing devices on the network 49a, discover the capabilities of the printing devices, and describe the capabilities to the users. Hosting the print application as a service on a server enables any information terminal or computing device that can communicate with the server 45 to submit print job files to any printing device with which the server can communicate. For example, the server 45 may be a combination of a print server and a web server and enables users to obtain printing service through the Internet. Accordingly, the information terminal or computing device can submit print job files to a printing device with which the information terminal or computing device cannot communicate directly.

Figure 2:
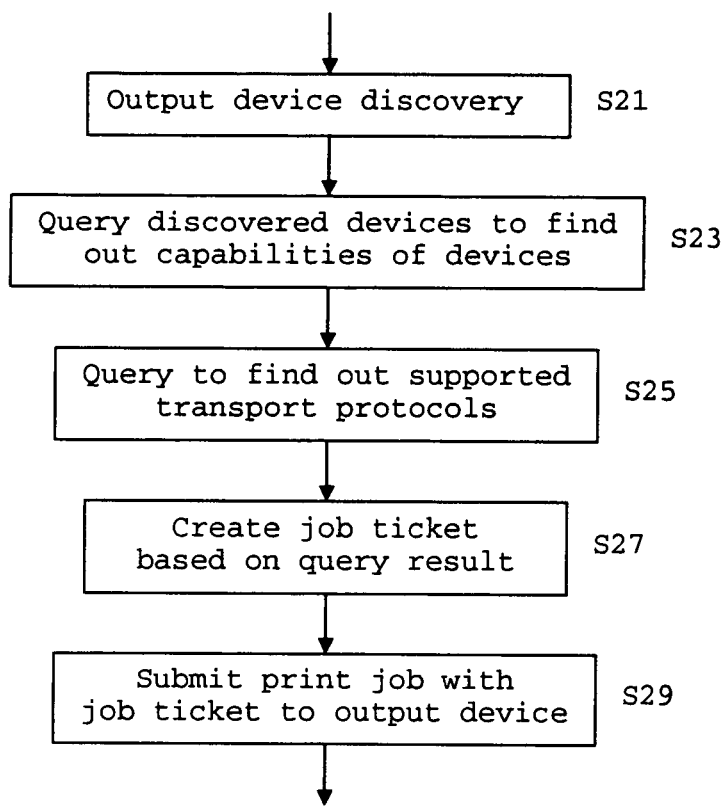
FIG. 2 shows a flow chart illustrating a process for assembling information for a print job including a print ready file to be submitted to a specified printer, in accordance with the first exemplary embodiment.

The print application provided by the server to the information terminal or computing device as a service enables the user to create a job ticket and submit a print ready file (such as shown in FIG. 2), and the server collects information tracking and identifying previously used printing devices and job tickets to automate future work flows. Submission methods include, but are not limited to, HTTP, HTTPS, FTP, FTP secure, SSH file transfer, etc. The server in turn can submit the print job and job ticket to the printer by any of the transport methods supported by the printer, including, but not limited to, TCP/IP Socket, LPR, IPP, IPP secure, HTTP, HTTP secure, FTP, FTP secure, SSH file transfer, etc.

Figure 5:
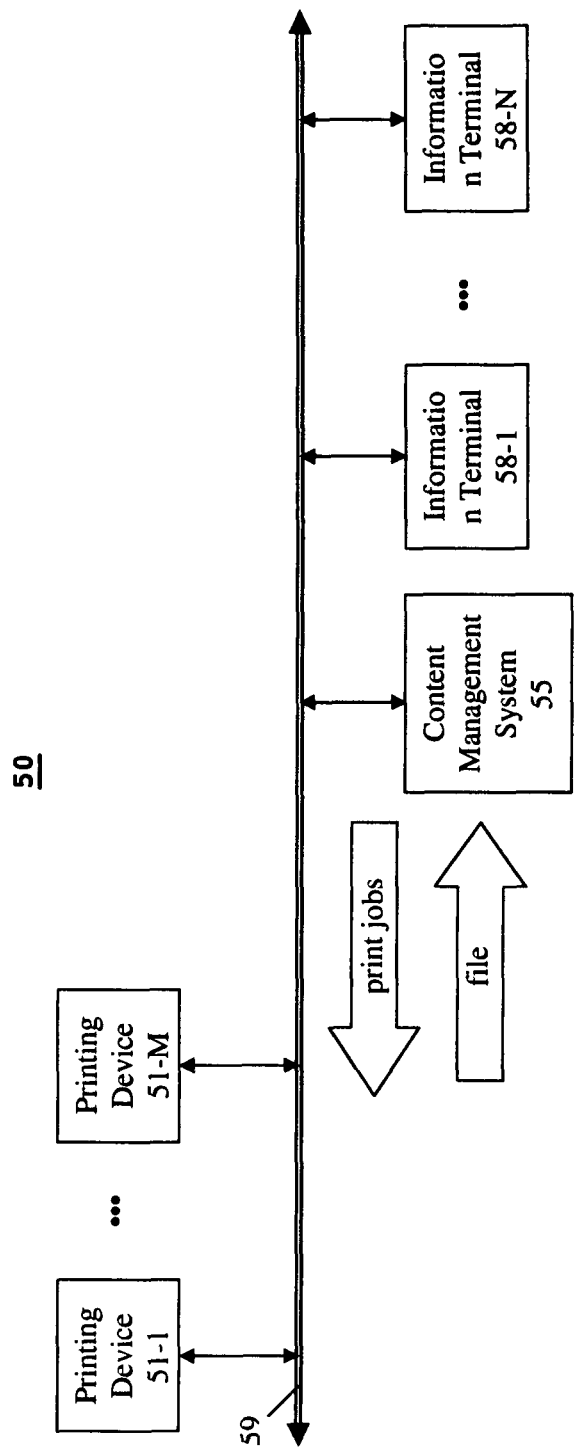
FIG. 5 shows a block diagram illustrating a system in accordance with a fourth exemplary embodiment.

FIG. 5 shows a system 50, in accordance with a fourth embodiment, comprised of a plurality of printing devices (51-1 through 51-M), a plurality of information terminals (58-1 through 58-N), a computing device or system 55 that stores and manages the job files and/or other content. In addition, a method to interact with the system 50 is provided, such as through, for example, a web interface or a file browser at a printing device. Any printing device that can host such a file browser interface can be used. In the case that a web interface is provided, the information terminal merely needs a web browser, and a thin client can be provided through the browser to the user. Thus, virtually any terminal device with a browser can request printing of a document, stored in the content system 55, and the terminal need not be a personal (or notebook or workstation) computer to access the content system.

As implied above, the subject matter of this disclosure, in some examples, is embodied essentially in software. In such a scenario, the subject matter is embodied in a print application, which is installed on a computing device. The print application can be configured to discover printing devices, discover device capabilities, present output options based on the device capabilities to the user, allow the user to select desired options, and forming a job ticket based on the selected options. The print application can also be configured to remember previously used printing devices and job tickets, and present such printing devices and job tickets for user selection.

In additional examples, the subject matter of this disclosure can embody hardware (for example, a printer) and software (for example, a web service) hosted on the printer. In such instances, a computing device can access the web service on the printer, select job ticket settings, and submit job files including the job ticket via the web service to the printer. The web service can remember the user, user preferences and previously used job tickets. An authentication and encryption processes (as well as other processes) are preferably provided to protect the user data.

The subject matter of this disclosure, in additional examples, can include a server and a web service hosted on the server. For example, the server and web service may be part of a printing system including one or more printer or printing devices (alternatively, the printing devices may simply be printers available through the network, that is, not managed by the server). In any event, the user in such examples can use the computing device to access the web service hosted on the server, select output device and job ticket settings, and submit the job files directly from the computing device, or via another server (for example, file server or content management system). Such other server or content management system can be part of the printing system or simply be available through the network. It should be appreciated from the examples above that the printing system, the files, and the user do not all have to be within a closed system or on the same network.

As discussed above, the proliferation of information technology has not eliminated the need to print, but rather has promoted more and more opportunities and demand for printing. It is becoming increasingly apparent that there is a substantial need for pay-per-print service to users in environments where the user does not own the output device (such as hotels, conference centers, airports and other transportation depots, other venues where people have time and occasion to retrieve electronic content, print shops, etc.).

For example, a print shop may have a web portal where a user can obtain an account that enables the user to submit print jobs to be printed and sent to the user or one or more third parties, for pay. In the case that the user wishes to send part or all of the output to a third party, the service provided by the web portal may also include an optional billing service, that is, bill of the user to the third party.

In another example, a graphic artist might maintain a web portal through which a user can select posters, signs, other graphical works provided by the artist, etc., select number of copies, and submit payment, and then the file to be printed is released to the user (for example, for downloading, transmitted through e-mail, etc.). The system can remember user information and user preferences (for example, job ticket) for re-prints at a later time.

The subject matter of this disclosure can be configured in some examples to facilitate printing from a PDA or other handheld device or information appliance and optionally provide billing capabilities (such as described above). For example, a PDA or smart mobile phone with a BlueTooth interface can instruct the MFP or printer to retrieve or download a file from a document depository on the network or from a web site. In this case, the information appliance does not need to be connected to the Internet or intranet as long as a user has a link via the BlueTooth interface to specify a document to be printed, for example, within the intranet or on the Internet. The information appliance, via the BlueTooth interface or while connected to the same network to which the MFP or printer is connected, can send the print job directly to the printing device, without the need for a printer driver and without the need for the application that created the document to be printed, while still maintaining the ability to control the output.

As mentioned above, in conventional printing environments, a user of a computing device typically needs to open the application used to create or edit the document, in order to select a printer through the interface provided by the operating system of the computing device, select settings via a print driver provided through the operating system, and then specify print of the document with the job settings which are combined with the job file to form a print file. Thus, in a conventional printing system, there are many requirements for the computing device. Conventional printing systems simply do not enable a user to create a print file without a print driver appropriate for the selected printer or on a computing device that does not have access to the application that originally created the document that the user desires to print.

Separating job ticket information from the print file and from the delivery mechanism makes the system much more flexible. For example, a file can be re-submitted with different settings to the same device, or with the same settings to a different device. The print file can be edited using the same application that created it (in contrast, print files in conventional printing systems have print codes added therein, and renders the file difficult for the user to edit). One advantage includes that job ticket creation and file creation can be performed by different users, one job ticket can be applied to many jobs, etc.

Thus, this disclosure describes exemplary embodiment of methods, apparatuses and systems for printing from any platform to any printer, without the need for a driver. In a preferred embodiment, the user is provided with means to create a job ticket, and submit a job to any printer. The system is further preferably configured to discover an unknown, available printer, discover the capabilities of the printer, discover the supported transport mechanism(s), describe the device to the user, submit the job, and "remember" the device address, device capabilities, and job ticket information. The system can overcome the need for drivers, the need for printer ports, and the need for the application with which the files were created.

The above specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An apparatus for submitting a print job to a specified printer, comprising:
   a print job conversion part configured to convert an electronic document which was created with a specific application software in a document format specific to the application software and is to be printed, into a print file, wherein the print file is in a print-ready printer independent form that is independent of the specified printer and independent of computing platform, and the conversion is performed without employing a printer driver corresponding to the specified printer and without employing the specific application software used to create the electronic document;
   a job ticket formation part configured to generate a job ticket file, based on print settings selected by a user, wherein the job ticket file is associated with, and separate from, the print file in the print-ready printer independent form;
   a job submission part configured to submit the job ticket file and the print file in the print-ready printer independent form to the specified printer, without using said printer driver and without employing the specific application software; and
   an archival part configured to archive the job ticket file and the print file in the print-ready printer independent form, by storing the job ticket file and the print file separately on a storage device, after the job ticket file and the print file are submitted by the job submission part, wherein the print file in the print-ready printer independent form is printable by any of a plurality of various different printers having different printer capabilities, and wherein each of (i) said print job conversion part converts the electronic document and (ii) said job submission part submits the print file, without opening the specific application that created the document corresponding to the print file.

2. The apparatus of claim 1 further comprising:

a discovery part configured to discover capabilities of the specified printer by communication with the specified printer;

a user interface part configured to present a list of the capabilities of the specified printer discovered through said discovery part, to a user for selection, wherein the job ticket generated by the job ticket formation part reflects the selected capabilities.

3. The apparatus of claim 2, wherein said job ticket file includes information specifying an output format of the print job.

4. The apparatus of claim 2, wherein said job submission part selects a communication protocol based on said capabilities of the specified printer discovered through said discovery part.

5. The apparatus of claim 2, wherein said discovery part submits a query to the specified printer by indicating a network address or hostname of the printer.

6. The apparatus of claim 2, wherein said discovery part submits queries to each of a plurality of printers, said queries inquiring capabilities of each printer.

7. The apparatus of claim 1, wherein the job ticket file is accessible through the archival part and is configured to be applied to one or more additional print jobs.

8. The apparatus of claim 1, wherein the job ticket file includes authentication information for the user performing the print job.

9. The apparatus of claim 1, wherein the job ticket file includes specific instructions for the specified printer to process and output the print file.

10. A print application embodied in a non-transitory computer-readable medium, including instructions which, when executed by an information terminal, enables a user to print a print job on a specified printer, without using a printer driver, the print application embodied in the non-transitory computer-readable medium comprising:

a print job conversion part configured to convert an electronic document which was created with a specific application software in a document format specific to the application software and is to be printed, into a print file, wherein the print file is in a print-ready printer independent form that is independent of the specified printer and independent of computing platform, and the conversion is performed without employing a printer driver corresponding to the specified printer and without employing the specific application software that was used to create the electronic document;

a job ticket formation part configured to generate a job ticket file, based on print settings selected by a user, wherein the job ticket file is associated with, and separate from, the print file in the print-ready printer independent form;

a job submission part configured to submit the job ticket file and the print file in the print-ready printer independent form to the specified printer, without using said printer driver and without employing the specific application software; and an archival part configured to archive the job ticket file and the print file in the print-ready printer independent form, by storing the job ticket file and the print file separately on a storage device, after the job ticket file and the print file are submitted by the job submission part, wherein the print file in the print-ready printer independent form is printable by any of a plurality of various different printers having different printer capabilities, and wherein each of (i) said print job conversion part converts the electronic document and (ii) said job submission part submits the print file, without opening the specific application that created the document corresponding to the print file.

11. A printing system comprising:

a plurality of printers; and an information terminal configured for user selection of one of the plurality of printers to print a job over a network, and said information terminal comprising:

a print job conversion part configured to convert an electronic document which was created with a specific application software in a document format specific to the application software and is to be printed, into a print file, wherein the print file is in a print-ready printer independent form that is independent of the specified printer and independent of computing platform, and the conversion is performed without employing a printer driver corresponding to the specified printer and without employing the specific application software that was used to create the electronic document;

a job ticket formation part configured to generate a job ticket file, based on print settings selected by a user, wherein the job ticket file is associated with, and separate from, the print file in the print-ready printer independent form;

a job submission part configured to submit the job ticket file and the print file in the print-ready printer independent form to the specified printer, without using said printer driver and without employing said specific application software; and an archival part configured to archive the job ticket file and the print file in the print-ready printer independent form, by storing the job ticket file and the print file separately on a storage device, after the job ticket file and the print file are submitted by the job submission part, wherein the print file in the print-ready printer independent form is printable by any of a plurality of various different printers having different printer capabilities, and wherein each of (i) said print job conversion part converts the electronic document and (ii) said job submission part submits the print file, without opening the specific application that created the document corresponding to the print job.

12. The printing system of claim 11, further comprising a server, said server providing said print job conversion part to said information terminal as a service.

13. The printing system of claim 11, wherein the selected printer provides said print job conversion part to said information terminal.

14. A non-transitory computer-readable medium embodying a program of instructions executable by a computer, said program of instructions embodied in the non-transitory computer-readable medium comprising:

a print job conversion part configured to convert an electronic document which was created with a specific application software in a document format specific to the application software and is to be printed, into a print file, wherein the print file is in a print-ready printer independent form that is independent of the specified printer and independent of computing platform, and the conversion is performed without employing a printer driver corresponding to the specified printer and without employing the specific application software that was used to create the electronic document;

a job ticket formation part configured to generate a job ticket file, based on print settings selected by a user, wherein the job ticket file is associated with, and separate from, the print file in the print-ready printer independent form;

a job submission part configured to submit the job ticket file and the converted electronic document in the print-ready printer independent form to the specified printer, without using said printer driver and said specific application software; and an archival part configured to archive the job ticket file and the print file in the print-ready printer independent form, by storing the job ticket file and the print file separately on a storage device, after the job ticket file and the print file are submitted by the job submission part, wherein the print file in the print-ready printer independent form is printable by any of a plurality of various different printers having different printer capabilities, and wherein each of (i) said print job conversion part converts the electronic document and (ii) said job submission part submits the print file, without opening the specific application that created the document corresponding to the print job.

15. A method for submitting a print job to a specified printer, comprising:
(i) converting an electronic document which was created with a specific application software in a document format specific to the application software and is to be printed, into a print file, wherein the print file is in a print-ready printer independent form that is independent of the specified printer and independent of computing platform, and the conversion is performed without employing a printer driver corresponding to the specified printer and without employing the specific application software that was used to create the electronic document;
(ii) generating a job ticket file, based on print settings selected by a user, wherein the job ticket file is associated with, and separate from, the print file in the print-ready printer independent form;
(iii) submitting the job ticket file and the print file in the print-ready printer independent form to the specified printer, without using a printer driver and said specific application software; and
(iv) archiving the job ticket file and the print file in the print-ready printer independent form, by storing the job ticket file and the print file separately on a storage device, after the job ticket file and the print file are submitted in (iii), wherein the converted electronic in the print-ready printer independent form is printable by any of a plurality of various different printers having different printer capabilities, and wherein each of (i) and (iii) is performed without opening the specific application that created the document corresponding to the print job.

16. The method of claim 15 further comprising:
(a) sending a query to the specified printer to discover capabilities of the specified printer;
(b) presenting a list of the capabilities of the specified printer discovered in (a), to a user for selection;
wherein the job ticket file is generated in (ii) based on selected capabilities, selected by the user in (b).

* * * * *